United States Patent [19]
Takahashi et al.

[11] 3,806,585
[45] Apr. 23, 1974

[54] PROCESS FOR PRODUCING XONOTLITE TYPE HYDROUS CALCIUM SILICATE

[75] Inventors: Akira Takahashi; Hideo Hayashi, both of Osaka, Japan

[73] Assignee: Agency of Industrial Science & Technology, Tokyo, Japan

[22] Filed: Apr. 5, 1972

[21] Appl. No.: 241,316

[30] Foreign Application Priority Data
Apr. 8, 1971 Japan.................................. 46-30572

[52] U.S. Cl. ................................................. 423/331
[51] Int. Cl............................................. C01b 33/24
[58] Field of Search...................... 423/331; 106/120

[56] References Cited
UNITED STATES PATENTS
3,131,024  4/1964  Leineweber ......................... 423/331
2,547,127  4/1951  Kalousek ............................. 423/331

FOREIGN PATENTS OR APPLICATIONS
1,193,172  5/1970  Great Britain....................... 423/331
554,996    3/1958  Canada................................ 423/331

OTHER PUBLICATIONS

Flint et al., "J. of Research of the National Bureau of Standards" Vol. 21, 1938, R. P. 1,147, pages 617–628.

Akahane et al., "Chemical Abstracts" Vol. 57, 1962, Col. 9,598h–9,599a.

*Primary Examiner*—Edward J. Meros
*Attorney, Agent, or Firm*—Kurt Kelman

[57] ABSTRACT

A hydrous calcium silicate compsed preponderantly of xonotlite of the shape of rod crystals is produced by adding 0.05 to 3 percent by weight of an alkali to a substantially equimolar mixed slurry of silicic acid and calcium oxide and subjecting the resultant mixture to hydrothermal reaction at 200° to 250° C under the pressure of saturated steam.

4 Claims, 1 Drawing Figure

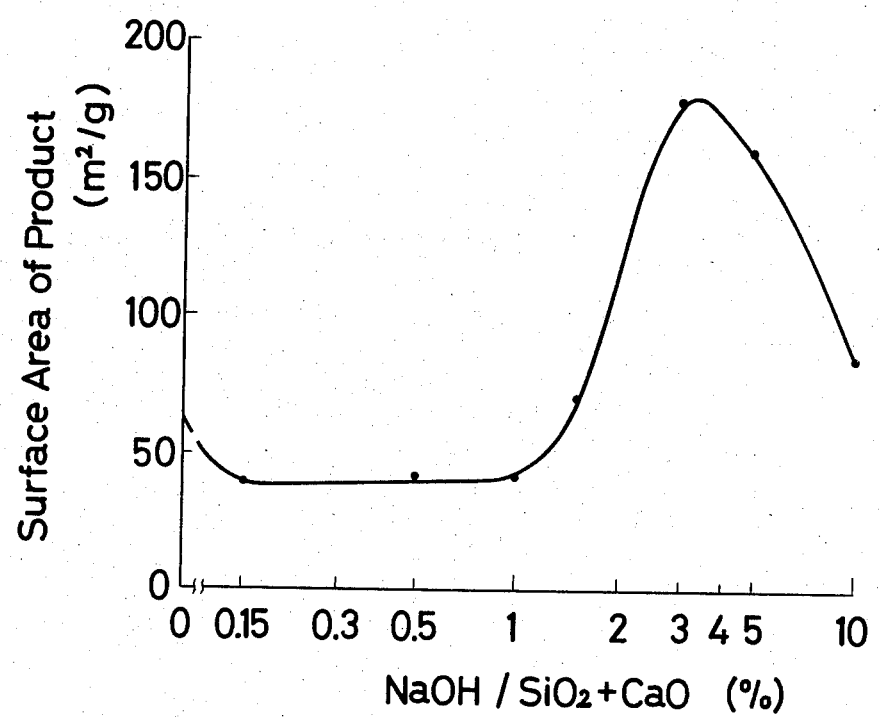

PROCESS FOR PRODUCING XONOTLITE TYPE HYDROUS CALCIUM SILICATE

This invention relates to a process for producing a xonotlite type hydrous calcium silicate.

Hydrous calcium silicate, particularly xonotlite, has outstanding refractoriness. A molded body comprised primarily of xonotlite provides strengths unattained by other inorganic materials. Thus, hydrous calcium silicate of xonotlite type is finding increased use in construction as a fireproof coating material and as a fireproof moisture retaining material and is further attracting attention as a potential filler for plastics and rubber products.

The process conventionally employed for the production of xonotlite is complicated and involves a time-consuming reaction. The production cost, therefore, is so high as to impede the growth of demand greatly.

Processes for producing xonotlite are known and described, for example, in U.S. Pat. No. 2,888,377 and U.S. Pat. No. 3,033,648. According to these processes, calcium oxide and silicic acid are equimolarly mixed in the form of a suspension or paste and are caused to undergo a reaction of the series of stages indicated below under a pressure of saturated steam at a temperature over 200° C to afford crystals of xonotlite as the final product.

$CaO + SiO_2 + H_2O \rightarrow 1.5 \sim 2.0CaO \cdot 1.0SiO_2 \cdot 1.5 \sim 2H_2O$ (hereinafter abbreviated as C–S–H (II)) $\rightarrow 1.0 \sim 1.5CaO \cdot 1.0SiO_2 \cdot 1.0 \sim 1.5H_2O$ (abbreviated as C–S–H (I)) $\rightarrow 5CaO \cdot 6SiO_2 \cdot 5H_2O$ (tobermorite) $\rightarrow 6CaO \cdot 6SiO_2 \cdot 1.0H_2O$ (xonotlite)

The numerals (excluding subscripts) in the preceding formula represent the mol numbers of the respective components.

For the process of U.S. Pat. No. 2,888,377, the reaction conditions are 246° C and 17 hours. If the reaction time is shorter or the reaction temperature is lower, then the reaction does not proceed until it affords the final product of xonotlite but terminates en route and produces such intermediates as C-S-H (I) or tobermorite.

U.S. Pat. No. 3,131,024 discloses a process which comprises adding calcium oxide to silicic acid at a molar ratio of 1.5 – 2.2 to 1, adding to the resultant mixture an alkali in the amount of 0.1 – 10 percent by weight based on the total weight of silicic acid and calcium oxide and such volume of water as to convert the whole into a slurry, and hydrothermally reacting this slurry at 180° C or over for 4 hours to afford dicalcium silicate alpha hydrate (hereinafter abbreviated as "α-C₂SH"), which is one form of hydrous calcium silicate and which is useful particularly as a flatting agent for clear lacquers. This process, however, cannot produce hydrous calcium silicate of xonotlite type.

Thus, calcium silicate hydrates are generally produced by causing the starting materials of silicic acid and calcium oxide to react at 180° C or over under the pressure of supersaturated steam. The products have different compositions from one another, depending chiefly on the molar ratio of calcium oxide to silicic acid, the reaction temperature, the reaction pressure and the reaction time. For example, Table 1 indicates that the same starting materials give birth to different products when the molar ratio, the reaction temperature and the reaction time are different.

Table 1

| | | | |
|---|---|---|---|
| CaO/SiO₂ molar ratio | 1.0 | 0.83 | 1.0 – 1.5 |
| Reaction temperature (°C) | 200 | 180 | 150 |
| Reaction time (hrs) | 8 | 5 | 2 |
| Product | Xonotlite | Tobermorite | C-S-H (I) |
| Molecular formula | 6CaO·6SiO₂·H₂O | 5CaO·6SiO₂·5H₂O | 1.0~1.5CaO·SiO₂·1.0~1.5H₂O |
| Crystallinity | Crystalline | Crystalline | Pseudo-crystalline |

In actuality, however, it frequently happens that a compound corresponding to such molar ratio cannot be obtained when the purity, grain size (specific surface area), degree of crystallinity and other factors of the starting materials of lime and silicic acid are varied. For example, when a quartziferous silica sand (98.5% of $SiO_2$, 0.9% of $Al_2O_3$, 0.05% of $Fe_2O_3$, and 0.4% of igloss) is mixed with a suspension of quick lime (97.76% of Ca, 0.03% of $SiO_2$, 0.06% of $Al_2O_3$, 0.69% of MgO and 1.31% of igloss) in the hydrated form and the resultant mixture is hydrothermally reacted at about 230° C under the supersaturated steam pressure of 28 kg/cm² for 2 hours, there is barely produced α–C2SH or C–S–H (I) and no xonotlite is produced. This may be explained by postulating that the solubility of silicic acid and that of calcium oxide during the reaction do not suit the temperature at which xonotlite is formed. The silica sand used as $SiO_2$ source has a lower dissolution velocity than that of calcium oxide. Consequently, $Ca^{++}$ ions which have resulted from dissolution are adsorbed on the surface of silica sand particles. On the surface of silica sand, these ions react with the dissolved silanol group, so that a film of noncrystalline calcium silicate hydrate is formed on the surface of the silica sand particles at the initial stage of reaction. As the reaction preceeds further and the temperature rises, the film of noncrystalline calcium silicate hydrate grows and the water content decreases gradually to give birth to α–C₂SH. Otherwise, crystalline growth from C-S-H (I) to tobermorite may occur as the noncrystalline calcium silicate hydrate is partially deprived of calcium and silicon constituents and water content. In any event, large amounts of unreacted silica sand and slaked lime invariably remain in the products.

In producing desired calcium silicate hydrate, particularly hydrous calcium silicate of xonotlite type, it is necessary to select the raw materials and fix reaction conditions as exactly as possible.

It is the main object of this invention to provide a process for producing xonotlite type hydrous calcium silicate of substantially uniform particle shape and size easily without having to fix reaction conditions as exactly as required by the conventional processes. The term "xonotlite type hydrous calcium silicate" as used in the present specification means a calcium silicate hydrate composed preponderantly of xonotlite of the shape of rod crystals.

It is another object of this invention to provide a process for producing xonotlite type hydrous calcium silicate by a short period of reaction.

The other objects and characteristics of this invention will become apparent from further description of the invention given hereinafter and the accompanying drawing.

The drawing is a graph showing the relationship between the amount of alkali added to the reactants and the specific surface area of the product obtained.

The inventors pursued various studies with a view to developing a process for producing calcium silicate consisting preponderantly of xonotlite of the shape of rod crystals. As a result, they have made a discovery that the desired hydrous calcium silicate of xonotlite type can easily be produced by allowing substantially equimolar amounts of calcium oxide and silicic acid to react in the presence of a small amount of an alkali.

When the starting materials are allowed to react in the presence of a small amount of an alkali added thereto, the solubility of calcium oxide is sharply lowered and that of silicic acid is heightened. Consequently, $Ca^{++}$ ions and $H_2SiO_4^{--}$ or $H_3SiO_4^{-}$ ions needed for the hydrothermal reaction come to occur in a normalized molar ratio. This precludes the aforesaid phenomenon observed in the absence of alkali addition, namely, the phenomenon that dissolved $Ca^{++}$ ions are adsorbed on the surface of silica sand particles and react with the silanol group. When silicic acid and calcium oxide are mixed in a substantially equimolar ratio and allowed to react in the presence of an alkali added thereto, a noncrystalline hydrous calcium silicate, $CSH_n$ ($C/S = 1, 0.3 < n < 1.2$), is formed quickly in the range of hydrothermal temperatures over 200° C. As the reaction proceeds, this compound gradually converts itself to a compound having a lower water content. When, at this stage, the reaction temperature is over the level of about 230° C, the conversion occurs directly from $CSH_n$ to xonotlite. If the reaction temperature is under 230° C, however, the conversion of $CSH_n$ to xonotlite occurs via C–S–H (I).

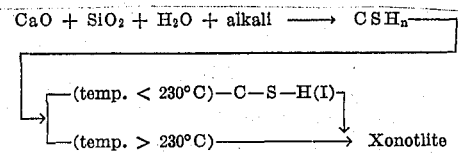

As for the raw materials, between 0.8 mol and 1.1 mols of silicic acid must be added to each mol of calcium oxide. If the amount of silicic acid added per mol of calcium oxide fails to reach 0.8 mol or exceeds 1.1 mols, the ratio of $Ca^{++}$ ions to $H_2SiO_4^{++}$ or $H_3SiO_4^{+}$ ions deviates from the normalized ratio for the hydrothermal reaction. Consequently, there is produced either tobermorite or C–S–H (I) and no xonotlite is produced. Desirably, an alkali may be added in the amount of from about 0.002 mol to 0.04 mol per mol of silicic acid used as the raw material. This range corresponds to the range of from about 0.15 to 3.0 percent by weight based on the total amount of calcium oxide and silicic acid.

A close relationship exists between the amount of an alkali added to the reactants and the grain size (specific surface area) of the product obtained. It is represented by the accompanying graph. The vertical axis of this graph represents the specific surface area of the product obtained and the horizontal axis the amount of alkali added based on the total weight of silicic acid and calcium oxide. Xonotlite of the shape of rod crystals having a surface area of about 40 m²/g is obtained when an alkali is added in the amount of 0.15 percent by weight to a mixture comprising 52 parts of silicic acid and 48 parts of calcium oxide. Xonotlite of the shape of ribbon-like crystals having an increased surface area is formed when the amount of the alkali added is not more than 0.15 percent by weight. As the amount of the alkali approaches 3 percent, xonotlite of the shape of flaky fibrous crystals occur in addition to xonotlite of the shape of rod crystals so that the overall specific surface area of the product increases to about 180 m²/g. $CSH_n$ of the shape of noncrystalline fluffy flocks is produced when the amount of the alkali is increased to 5 percent.

Now, the process of production according to this invention is described. First, prescribed amounts of calcium oxide and silicic acid are mixed and agitated in water to form a mixed slurry. The stated amount of caustic soda is added to the mixed slurry. The mixture is poured in an autoclave and subjected to hydrothermal reaction at about 200°–250° C under a saturated steam pressure exceeding 25 kg/cm³.

The reaction temperature has a marked effect upon the product to be obtained. For the process of this invention, the reaction temperature desirably ranges from about 200° C to about 250° C. When the reaction temperature is 190° C or under, the reaction produces noncrystalline $CSH_n$, C–S–H (I) or crystalline tobermorite and no xonotlite even if the reaction is continued for eight hours, for example. When the reaction temperature exceeds 250° C, there follows an undesirable result that foshagite ($4CaO_2·3SiO_2·H_2O$), tricalcium silicate hydrate ($C_3SH_{1.5}$) and $\alpha$–$C_2S$ hydrate partially mingle in the product. At reaction temperatures in the range of from about 200° C to about 230° C, the reaction proceeds from the starting materials to the final product of xonotlite via the intermediate of C–S–H (I). Despite this intermediate, the final is not different, in any way, from that which is obtained at reaction temperatures in the range of from about 230° C to about 250° C. A close relationship exists between the reaction time and the reaction temperature. At the reaction temperatures of about 200° C, the reaction time is about 1 hour. At the reaction temperature of about 230° C, 30 to 45 minutes of reaction time suffices. At the reaction time approximating 250° C, several minutes of reaction time is sufficient. By carrying out the reaction as mentioned above, there can be obtained a hydrous calcium silicate consisting preponderantly of xonotlite having a practically uniform grain size.

This invention enables a xonotlite type hydrous calcium silicate to be obtained stably and easily by adding a small amount of an alkali to the reactants without requiring the selection of raw materials to be controlled rigidly as mentioned above. Further, it reduces the reaction time to a great extent. By virtue of these improvements over the conventional processes, the process of the present invention renders the produciton of xonotlite commercially feasible. Consequently, the product "xonotlite" can be used extensively and readily as thermal insulating materials, fireproof building materials, fillers, etc.

The present invention is further described with reference to working examples, which are cited hereinafter for the purpose of illustration and should not be construed as limiting the invention in any way.

Example 1:

In 1,000 parts of water at 30° C, 52 parts of industrial-grade silica sand (98.5% of $SiO_2$, 0.9% of $Al_2O_3$, 0.05% of $Fe_2O_3$, and 0.4% of igloss) having a grain size all passable through a sieve of 325 mesh and 48 parts of fresh quick lime (97.76% CaO, 0.03% of $SiO_2$, 0.06% of $Al_2O_3$, 0.69% of MgO, and 1.31% of igloss) obtained by calcining industrial-grade calcium carbonate at 1,000° C for 3 hours were mixed under agitation. At the ratio indicated in Table 2, caustic soda was added to the mixed slurry. The resultant mixture was placed in an autoclave and subjected to hydrothermal reaction at 230° C under the saturated steam pressure of 28 kg/cm² for about 45 minutes. At the end of this reaction time, the solid substance formed in the aqueous solution was separated and dried at 150° C for 5 hours to afford a dry powdery substance. The results are shown in Table 2. The identification of the reaction product was made on the basis of the results of X-ray diffraction analysis and differential heat analysis. The shape of crystals and the grain size were determined by observation using an electronic microscope. The term "filter-dehydration property" indicates the degree of suction dehydration effected by a filter paper (No. 3). The degrees were rated on the "A–D" scale, wherein A denotes substantially complete removal of water, B removal of three-fourths of the whole water, C removal of about one-half of the whole water, and D substantial absence of water removal.

the reactants fell in the range of from 0.05 to 3 percent. The xonotlite to be formed without the addition of an alkali was undesirable because it consisted of irregular lath-like crystals and had inferior dehydration property. A small amount of $CSH_n$ occurred in addition to xonotlite of rod crystals when the amount of NaOH added was 3 percent. When the amount of NaOH was 3.5 or 5 percent, there was formed $CSH_n$ alone.

The specific surface area (determined by the BET nitrogen method) increased sharply to over 150 m²/g when the amount of added NaOH exceeded 3 percent. The ignition loss at 1,000° C showed the minimum value of 2.51 percent when the amount of added NaOH was 0.15 percent. It increased with the increasing amount of added NaOH. It reached 10 percent when the amount of added NaOH rose to 3.5 percent.

When the procedure of the aforementioned example was repeated by using KOH in the place of NaOH, there were obtained the same results.

We claim:

1. A process for producing xonotlite type hydrous calcium silicate, which comprises mixing calcium oxide and silicic acid in an amount of 0.8 to 1.1 mols of silicic acid per mol of calcium oxide; and one alkali compound selected from the group consisting of sodium hydroxide and potassium hydroxide in amount of 0.05 to 3 percent by weight based on the total weight of calcium oxide and silicic acid; subjecting the resulting mixture to hydrothermal reaction at 200° to 250° under pressure of saturated steam, separating and drying the hydrate formed consequently, and recovering xonotlite in the shape of rod crystals with a surface area of about Table 2

| No. | Amount of NaOH added, in % by weight based on total weight of CaO and $SiO_2$ | Reaction product | Shape of crystal | Grain size (L) × (W), in μ | Specific surface area (m²/g) | Ignition loss at 1000°C (%) | Filter-dehydration property |
|---|---|---|---|---|---|---|---|
| 1 | 0 | Xonotlite | Ribbon | 5~10×0.25 | 64.8 | 3.32 | D |
| 2 | 0.05 | Xonotlite | Rod | 5×0.05 | 50.0 | 3.0 | C |
| 3 | 0.15 | Xonotlite | Rod | 5×0.05 | 40.4 | 2.51 | C |
| 4 | 1.0 | Xonotlite | Rod | 5×0.05 | 40.6 | 2.95 | A |
| 5 | 2.0 | Xonotlite | Rod | 5×0.05 | 79.4 | 7.98 | A |
| 6 | 3.0 | Xonotlite + $CSH_n$ | Flaky fiber + rod | 3~5×0.03 | 80.0 | 8.5 | B |
| 7 | 3.5 | $CSH_n$ | Fluffy flocks | 3~5×0.01~0.03 | 160.0 | 13.0 | B |
| 8 | 5.0 | $CSH_n$ | Fluffy flocks | 3~5×0.01~0.03 | 159.2 | 14.43 | B |

In the preceding table, the product of Run No. 1 was confirmed by X-ray analysis to contain unaltered quartz in the amount of about 5 percent. The reaction product $CSH_n$ was identified to be a xonotlite type noncrystalline hydrous calcium silicate, with n having the value of 0.3 to 1.2.

The results of Table 2 indicate that the reaction product consisted solely of xonotlite having the shape of rod crystals when the amount of NaOH added to 40m²/g to 80m²g.

2. The process of claim 1 wherein the amount of said alkali compound is 0.15 to 3 percent by weight.

3. The process of claim 1 wherein the amount of said alkali compound is 1 percent to 2 percent by weight.

4. The process of claim 1 wherein the saturated steam pressure exceeds 25Kg/cm³.

* * * * *

UNITED STATES PATENT OFFICE
CERTIFICATE OF CORRECTION

Patent No. 3,806,585          Dated    Apr. 23, 1974

Inventor(s) Akira Takahashi et al

It is certified that error appears in the above-identified patent and that said Letters Patent are hereby corrected as shown below:

On the front page, under [30], change "Apr." to --May--

Signed and sealed this 1st day of October 1974.

(SEAL)
Attest:

McCOY M. GIBSON JR.          C. MARSHALL DANN
Attesting Officer             Commissioner of Patents